United States Patent
Shin et al.

(10) Patent No.: US 11,459,673 B2
(45) Date of Patent: Oct. 4, 2022

(54) CARBON FIBER CARBONIZATION APPARATUS USING MICROWAVE

(71) Applicant: LG CHEM, LTD., Seoul (KR)

(72) Inventors: Ji Hye Shin, Daejeon (KR); Tae Eon Park, Daejeon (KR); Su Jin Kim, Daejeon (KR); Ki Hwan Kim, Daejeon (KR); Ii Ha Lee, Daejeon (KR); Jun Young Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 26 days.

(21) Appl. No.: 17/047,830

(22) PCT Filed: Jul. 22, 2019

(86) PCT No.: PCT/KR2019/009038
§ 371 (c)(1),
(2) Date: Oct. 15, 2020

(87) PCT Pub. No.: WO2020/022724
PCT Pub. Date: Jan. 30, 2020

(65) Prior Publication Data
US 2021/0115598 A1 Apr. 22, 2021

(30) Foreign Application Priority Data

Jul. 23, 2018 (KR) .................. 10-2018-0085419
Jul. 10, 2019 (KR) .................. 10-2019-0083343

(51) Int. Cl.
*D01F 9/32* (2006.01)
*B01J 19/12* (2006.01)

(52) U.S. Cl.
CPC .............. *D01F 9/32* (2013.01); *B01J 19/126* (2013.01)

(58) Field of Classification Search
CPC ... D01F 9/32; D01F 9/225; D01F 9/22; D01F 9/322; B01J 19/126; D06M 10/00;
(Continued)

(56) References Cited

U.S. PATENT DOCUMENTS 4,900,483 A 2/1990 Witzke et al.
6,514,449 B1 * 2/2003 Paulauskas ............ B29C 70/16
264/167
(Continued)

FOREIGN PATENT DOCUMENTS

CN 103990297 A 8/2014
CN 107820522 A 3/2018
(Continued)

*Primary Examiner* — Xiuyu Tai
(74) *Attorney, Agent, or Firm* — Dentons US LLP

(57) ABSTRACT

The present invention relates to a carbon fiber carbonization apparatus using a microwave. The carbon fiber carbonization apparatus using a microwave comprises: a carbonization furnace into which the microwave is irradiated from an irradiation part disposed at one side thereof; a moving tube through which a carbon fiber moves along the inside thereof and which is mounted to pass through the carbonization furnace; and a heating element coupled to an outer circumferential surface of the moving tube to absorb the microwave so as to generate heat. A portion of the moving tube is covered by the heating element at the position, but a remaining portion is exposed at a position at which the heating element is coupled to the moving tube.

10 Claims, 2 Drawing Sheets

(58) Field of Classification Search
CPC .............. D06M 10/003; D06M 10/025; D10B
2101/12; H05B 6/708; H05B 6/788;
H05B 6/78; H05B 6/80; F27B 5/04;
F27B 5/14; F27D 11/12; H01J 37/32192;
H01J 37/32229
USPC .................................................. 204/157.43
See application file for complete search history.

(56) References Cited

U.S. PATENT DOCUMENTS

| | | | |
|---|---|---|---|
| 7,824,495 B1 * | 11/2010 | White | B01J 19/126 118/723 MW |
| 2009/0277772 A1 | 11/2009 | Kaiser et al. | |
| 2013/0098904 A1 | 4/2013 | Harada et al. | |
| 2013/0196155 A1 * | 8/2013 | Paulauskas | C08J 5/06 428/367 |
| 2016/0130732 A1 | 5/2016 | Suzuki | |
| 2016/0348283 A1 | 12/2016 | Jo et al. | |
| 2017/0327974 A1 | 11/2017 | Zushi et al. | |
| 2018/0352616 A1 * | 12/2018 | Oishibashi | H05B 6/708 |
| 2020/0056306 A1 | 2/2020 | Kim et al. | |

FOREIGN PATENT DOCUMENTS

| | | |
|---|---|---|
| JP | H03-180513 A | 8/1991 |
| JP | H06108317 A | 4/1994 |
| JP | 2002013031 A | 1/2002 |
| JP | 2008045227 A | 2/2008 |
| JP | 2009533562 A | 9/2009 |
| JP | 2013002767 A | 1/2013 |
| JP | 5191004 B2 | 4/2013 |
| JP | 2014067575 A | 4/2014 |
| JP | 5787289 B2 | 9/2015 |
| KR | 10-2012-0070327 A | 6/2012 |
| KR | 10-2012-0077683 A | 7/2012 |
| KR | 10-2016-0137526 A | 11/2016 |
| KR | 10-2016-0138775 A | 12/2016 |
| KR | 10-2016-0138776 A | 12/2016 |
| KR | 10-2016-0140268 A | 12/2016 |
| KR | 10-1755267 B1 | 7/2017 |
| KR | 10-2018-0071184 A | 6/2018 |
| WO | 2006101084 A1 | 9/2006 |
| WO | 2018123117 A1 | 7/2018 |

* cited by examiner

CARBON FIBER CARBONIZATION APPARATUS USING MICROWAVE

CROSS-REFERENCE TO RELATED APPLICATIONS

The present application is a National Phase entry pursuant to 35 U.S.C. § 371 of International Application No. PCT/KR2019/009038 filed on Jul. 22, 2019, and claims the benefit of the priority of Korean Patent Application Nos. 10-2018-0085419, filed on Jul. 23, 2018, and 10-2019-0083343, filed on Jul. 10, 2019, which are hereby incorporated by reference in their entirety.

FIELD

The present invention relates to a carbon fiber carbonization apparatus using a microwave, and more particularly, to a carbon fiber carbonization apparatus using a microwave which directly increases in heating effect by modifying a structure of an internal heating element and improves mechanical properties of a carbon fiber when the carbon fiber is carbonized using the microwave.

BACKGROUND

A carbon fiber means a fiber obtained by pyrolyzing an organic carbon fiber material having the form of a fiber, which is made of polyacrylonitrile (PAN), a pitch that is petroleum/coal hydrocarbon residues, or rayon, under an inert atmosphere as a carbon material having a fiber length, in which a carbon element has a mass content of 90% or more.

Carbon fiber is lighter than steel and superior in strength and thus is being widely applied to various fields such as automotive, aerospace, wind power generating, sport, and the like. For example, recently, due to environmental problems, environmental regulations related to vehicle exhaust gas are being tightened, and the demand for high-efficiency is increasing. As a result, techniques using carbon fiber reinforced composites have attracted attention as a method that is capable of reducing a weight of a vehicle without sacrificing structural and mechanical strength.

However, in order to apply the techniques to various industries, it is necessary to develop a technology that is capable of mass-producing the carbon fiber having high performance at low cost.

In the carbonization process of the carbon fiber according to the related art, low-temperature carbonization at a temperature of 700° C. to 900° C. and high-temperature carbonization at a temperature of 1,000° C. are performed in stages. For this, a process using an electric furnace has been generally performed. However, a carbon fiber carbonization process that uses the carbonization furnace using microwaves to save process cost and energy is being studied. In general, it is necessary to maintain an inert atmosphere around the carbon fiber during the high-temperature carbonization process. In the high-temperature carbonization, the microwaves cause indirect heating due to raising of an atmosphere temperature and direct heating due to the carbon fiber itself. The direct/indirect heating effects are different from each other according to a size, structure, and position of a heating element within the carbonization furnace. A structure in which a passage, through which the carbon fiber passes, is sealed by the heating element has a problem in that the direct heating effect by the microwaves is not high.

In this regard, there is a need for a carbonization process that enhances the direct heating effect by the microwaves.

(Patent Document 1) Korea Patent Publication No. 2016-0140268

(Patent Document 2) Japanese Patent Laid-Open Application No. 2013-002767

(Patent Document 3) Korea Patent Publication No. 2018-0071184

SUMMARY

The present invention has been made to solve the above problems, and an object of the present invention is to provide a carbon fiber carbonization apparatus in which one side of a heating element disposed within a carbonization furnace is opened in a direction in which a microwave is irradiated to simultaneously perform direct and indirect heating at a position at which the heating element is disposed in order to improve the direct heating effect by the microwave.

A carbon fiber carbonization apparatus using a microwave according to the present invention comprises: a carbonization furnace into which the microwave is irradiated from an irradiation part disposed at one side thereof; a moving tube through which a carbon fiber moves along the inside thereof and which is mounted to pass through the carbonization furnace; and a heating element coupled to an outer circumferential surface of the moving tube to absorb the microwave so as to generate heat, wherein a portion of the moving tube is covered by the heating element, but a remaining portion is exposed at a position at which the heating element is coupled to the moving tube.

The portion at which a surface of the moving tube is exposed may be disposed toward the irradiation part from which the microwave is irradiated.

According to the present invention, the heating element may have a shape in which a groove having a size that is large enough to allow the moving tube to enter therein is formed, and when the moving tube enters the groove, a surface of the moving tube may be exposed at the opened portion of the groove.

The heating element may have a polyhedral shape, and one surface of the heating element is recessed to form a groove. Also, the heating element may occupy 1.7% or less of an internal volume of the carbonization furnace.

According to the present invention, the moving tube may be manufactured so that the microwave is transmitted. That is, a portion of the microwave irradiated from the irradiation part may be transmitted through the moving tube and be directly absorbed to the carbon fiber, and another portion of the microwave may be absorbed by the heating element.

According to the present invention, the moving tube may be made of quartz. The moving tube made of quartz may have a loss tangent of less than 0.0003.

A cross-sectional area of the moving tube may be equal to or less than 5.9% of a cross-sectional area of the carbonization furnace, and an inert gas may be injected into the moving tube.

Also, the irradiation part may comprise a waveguide through which the microwave moves through the carbonization furnace, and an end of the waveguide connected to the carbonization furnace is disposed at a position that is directed to the heating element.

In the carbon fiber carbonization apparatus according to the present invention, the microwave may be directly absorbed by the carbon fiber at a position at which the heating element is disposed to perform direct heating, and simultaneously, indirect heating may be performed by radiation heat of the heating element. Therefore, the carbonization may be efficiently performed to improve the mechanical properties such as the elasticity, the tensile strength, and the diameter.

According to the present invention, a portion at which a surface of the moving tube is exposed may be disposed toward the irradiation part from which the microwave is irradiated, at a position at which the heating element is coupled to the moving tube, to improve direct heating effect.

Since the heating element has a shape in which the groove is formed and a size which is enough to allow the moving tube to pass therethrough, the heating element may be easily coupled to the moving tube.

According to the present invention, the moving tube may be made of quartz and have the loss tangent value of less than 0.0003. That is, as the loss tangent value approaches zero, the transmittance of the microwave may increase to minimize the amount of microwave which is absorbed by the moving tube to heat the moving tube.

Since a transverse section of the moving tube has a cross-sectional area of 5.9% or less in comparison to a cross-sectional area of a transverse section of the carbonization furnace, an amount of inert gas (nitrogen, etc.) injected into the moving tube may be reduced.

DETAILED DESCRIPTION

Figure 1:
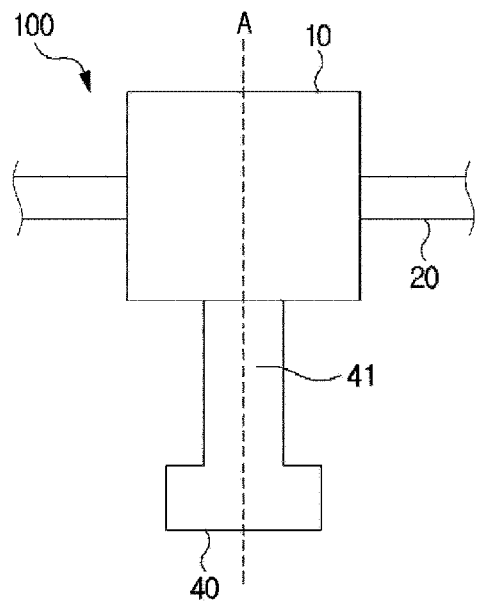
FIG. 1 is a cross-sectional view of a carbon fiber carbonization apparatus 100 using a microwave according to an embodiment of the present invention.

The detailed description of the present invention is intended to fully explain the present invention to those skilled in the art. In the entire specification, when it is described that one comprises (or includes or has) some elements, or any structure and shape are defined as "features", it does not mean excluding other elements and other structures and shapes unless specifically stated otherwise, but it is mean including other elements, structures, and shapes.

Since the present invention may have diverse modified embodiments, preferred embodiments are illustrated in the drawings and are described in the detailed description of the invention. However, this is not intended to limit the contents of the invention according to embodiments, and it should be understood that the present invention covers all the modifications, equivalents, and replacements within the idea and technical scope of the present invention.

Figure 2:
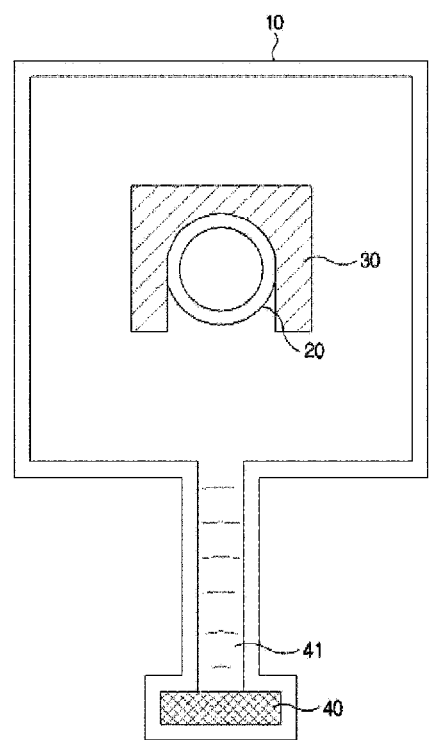
FIG. 2 is an internal cross-sectional view at plane A of FIG. 1 of a carbonization furnace according to an embodiment of the present invention.
Figure 3:
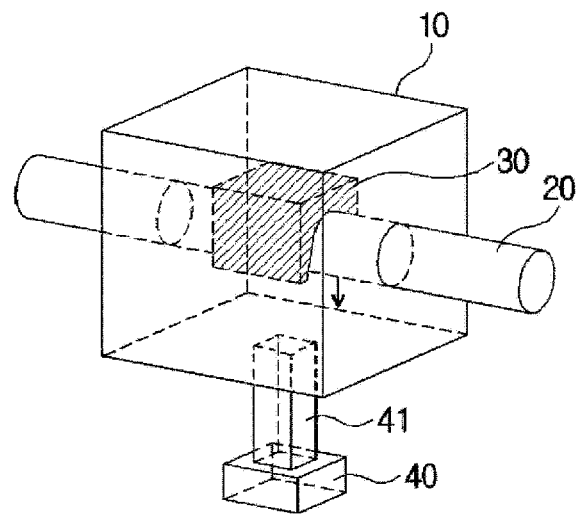
FIG. 3 is a perspective view of the carbon fiber carbonization apparatus of FIG. 1 using the microwave according to an embodiment of the present invention.
Figure 4:
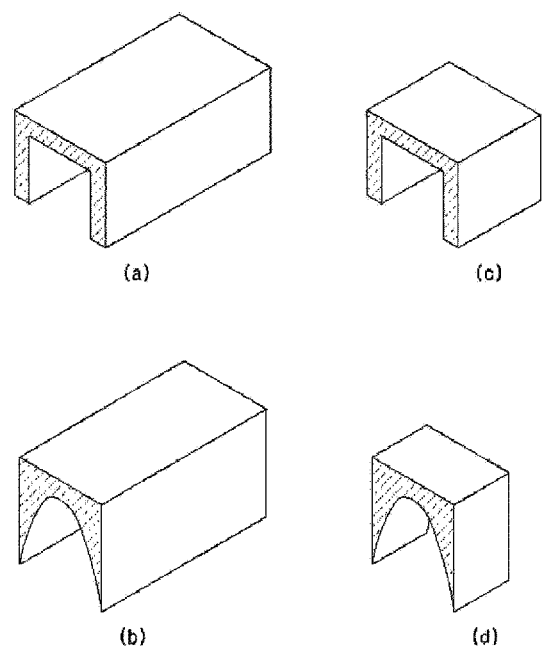
FIGS. 4(a) and 4(c) are views illustrating a shape in which a rectangular pillar through-hole is formed in a octahedral heating element according to an embodiment of the present invention.
FIGS. 4(b) and 4(d) are views illustrating a shape in which a cylindrical through-hole is formed in a heating element with 3 plane faces and one arcuate (interior) face according to an embodiment of the present invention.

FIG. 1 is a cross-sectional view of a carbon fiber carbonization apparatus 100 using a microwave according to an embodiment of the present invention, FIG. 2 is an internal cross-sectional view at a plane A of a carbonization furnace according to an embodiment of the present invention, FIG. 3 is a perspective view of the carbon fiber carbonization apparatus using the microwave according to an embodiment of the present invention, FIGS. 4(a) and 4(c) are views illustrating a shape in which a rectangular pillar through-hole is formed in an octahedral heating element according to an embodiment of the present invention, and FIGS. 4(b) and 4(d) are views illustrating a shape in which a cylindrical through-hole is formed in a heating element with 3 plane faces and one arcuate (interior) face according to another embodiment of the present invention.

According to the present invention, the carbon fiber carbonization apparatus 100 using the microwave may comprise a carbonization furnace 10, a moving tube 20, a heating element 30, and an irradiation part 40.

The carbonization furnace 10 performs a function of carbonizing a carbon fiber within the carbonization furnace 10 by using a microwave. In general, a firing process of the carbon fiber comprises a stabilization process, a low-temperature carbonization process performed at a temperature of 700° C. to 900° C., and a high-temperature carbonization process performed at a temperature of 1,000° C. or more, which are performed in stages. The high-temperature carbonization process may be performed in the carbonization furnace 10 according to the present invention. For this, a high-temperature atmosphere of 1,000° C. or more may be maintained in the carbonization furnace 10.

Also, in the heating using the microwave in the carbonization furnace 10, indirect heating, which is performed by radiant heat of a heating source (the heating element in the present invention) disposed around the carbon fiber, and direct heating, which is performed by directly irradiating the carbon fiber with the microwave to uniformly heat the carbon fiber through microwave reaction in the fiber itself, are performed at the same time.

The inert atmosphere is essential to prevent any reaction with the carbon fiber from occurring in the process of heating the atmosphere around the carbon fiber during the carbonization process. For this, in the present invention, the inert atmosphere is formed within the carbonization furnace 10. That is, the moving tube 20 (and the carbonization furnace 10) is filled with an inert gas.

Also, in the case of the direct heating, the carbon fiber has to be directly irradiated with the microwave. It should be noted that the term "direct irradiation" described therein means that molecules of the carbon fiber are vibrated by the microwave, and thus, temperature increases by frictional force caused by the vibration.

It is noted that the carbonization furnace 10 is not limited to a specific configuration as long as the carbonization furnace 10 sufficiently performs the above-described function.

In the present invention, the carbonization furnace 10 has a container shape having a predetermined space therein and is connected to communicate with a waveguide 41. Also, the irradiation part 40 generating the microwave is disposed at an opposite side of the waveguide 41.

The moving tube 20 may provide a passage having a predetermined shape so that the carbon fiber is movable within the moving tube 20.

The moving tube 20 may be made of quartz having high transmittance with respect to the microwave. In an embodiment of the present invention, although the moving tube 20 has a cylindrical shape, but it is noted that the shape of the moving tube is not limited to a specific shape as long as the moving tube is capable of performing the above-described function. However, the moving tube according to the present invention has sufficient transmittance so that the microwave is transmitted therethrough. When the moving tube is made of quartz, it is preferable that a loss tangent that represents a loss of the microwave is less than 0.0003 due to the material of the moving tube.

The heating element 30 may serve to maintain a high-temperature atmosphere required during the carbonization process and be disposed outside the moving tube 20 within the carbonization furnace 10. Also, the heating element 30 for performing the above-described function may be made of silicon carbide (SiC). The heating element 30 absorbs the microwave and thus is heated. When heated, the heating element 30 radiates heat to the carbon fiber to indirectly heat the carbon fiber.

Also, the heating element 30 may be open toward a direction in which the microwave is irradiated so that the carbon fiber can be directly irradiated by the microwave. Due to this structure, the carbon fiber may be directly heated to improve a heating effect. When the existing process conditions in which the moving tube is surrounded by all surfaces of the carbon fiber, mechanical properties such as elasticity, tensile strength, a diameter, and the like may be improved.

The heating element 30 according to an embodiment of the present invention may have a hexahedral shape of which corresponding surfaces are penetrated by the moving tube 20 and have a structure of which one surface of surfaces which are not penetrated by the moving tube 20, is opened. In the present invention, the heating element 30 has a shape in which a groove having a size that is large enough to allow the moving tube 20 to enter therein is formed. When the moving tube 20 enters the groove, a surface of the moving tube may be exposed at the opened portion of the groove. Also, the portion at which the surface of the moving tube 20 is exposed is disposed to face the irradiation part 40 from which the microwave is irradiated.

Referring to FIGS. 4(a), 4(b), 4(c) and 4(d), the through-hole of the heating element of FIGS. 2-3 may be changed into a rectangular pillar shape, a cylindrical shape, or a polyhedral shape according to the shape of the moving tube passing through the heating element according to an embodiment of the present invention. Also, power to be applied may vary according to a length and volume of the heating element 30. When the heating element 30 has a length exceeding 7 cm, or a ratio of occupying the inside of the carbonization furnace 10 by the heating element 30 exceeds 1.7%, there may be a problem that higher power to be applied is required to maintain a high temperature 1,000° C. or more for the high-temperature carbonization process. Thus, the heating element according to the present invention may have a length of 7 cm or less, and a volume ratio occupied in the carbonization furnace 10 is limited to 1.7% or less so that energy efficiency is improved in the entire carbon fiber firing process.

It is noted that the heating element 30 is not limited to a specific configuration as long as the heating element 30 is capable of performing the above-described function. In the drawings, although the heating element 30 is shown in shape which has the hexahedral shape and of which one surface is concavely recessed, the present invention is not limited thereto. For example, the heating element may have various shapes so long as the heating element 30 has a structure of which a portion covers a portion of the moving tube 20, and a portion exposes a portion of the moving tube 20.

The irradiation part 40 serves to generate and irradiate microwaves within the carbonization furnace 10. For this, the irradiation part 40 may comprise a waveguide 41.

The irradiation part 40 and the carbonization furnace 10 are connected to each other by the waveguide 41. The waveguide serves to provide a passage through which the microwaves move.

It is noted that the irradiation part 40 is not limited to a specific configuration as long as the irradiation part 40 sufficiently performs the above-described function. That is, a magnetron may be used as the irradiation part 40.

For reference, nitrogen as an inert gas may be injected into the moving tube 20 and the carbonization furnace 10 or injected into only the moving tube 20. Here, in order to reduce an injection amount of nitrogen, it is preferable that a cross-sectional area of the moving tube 20 is limited to 5.9% or less when compared to a cross-sectional area of the carbonization furnace 10. That is, when the cross-sectional area of the moving tube 20 exceeds 5.9% or more, the injection amount of nitrogen may increase. Thus, as the injection amount of nitrogen increases, indirect heating efficiency may also be deteriorated. Also, the heating element 30 coupled to the moving tube 20 may increase in size to deteriorate efficiency relative to an output of the apparatus.

Experimental Example 1

A carbon fiber carbonization apparatus 100 using a microwave according to an embodiment of the present invention was utilized. Particularly, a heating element having a hexahedral structure in which one surface of surfaces except for a surface through which a moving tube is penetrated within a carbonization furnace is opened was used. The open surface was directed toward a direction in which the microwave is irradiated. Also, in Experimental Example 1, a heating element having a length of 1.8 cm in a direction in which the carbon fiber moves was used.

Experimental Example 2

A carbon fiber carbonization apparatus 100 using a microwave according to an embodiment of the present invention was utilized. Particularly, a heating element having a hexahedral structure in which one surface of surfaces except for a surface through which a moving tube is penetrated within a carbonization furnace is opened was used. The open surface was directed toward a direction in which the microwave is irradiated. Also, in Experimental Example 2, a heating element having a length of 5 cm in a direction in which the carbon fiber moves was used.

Experimental Example 3

A carbon fiber carbonization apparatus 100 using a microwave according to an embodiment of the present invention was utilized. Particularly, a heating element having a hexahedral structure in which one surface of surfaces except for a surface through which a moving tube is penetrated within a carbonization furnace is opened was used. The open surface was directed toward a direction in which the microwave is irradiated. Also, in Experimental Example 3, a heating element having a length of 6.8 cm in a direction in which the carbon fiber moves was used.

Comparative Example

In Comparative Example, a heating element having a hexahedral structure in which all four surfaces are sealed except for a surface through which a moving tube is penetrated within a carbonization furnace using a microwave was used. Also, in Comparative Example, a heating element having a length of 1.8 cm to 12 cm in a direction in which a carbon fiber moves was used.

Also, in order to compare the results of the carbonization process due to the structural change of the heating element 30, the carbon fibers according to Comparative Examples and Embodiments 1 to 3 moved to the carbonization furnace 10 after a low-temperature carbonization process in the electric furnace. An SiC heating element was used as the heating element 30, and the inside of the carbonization furnace 10 was equally maintained at a temperature of 1,100° C. to 1,200° C.

TABLE 1

| Process speed | Example | SiC length (cm) | Elasticity (GPa) | Tensile strength (GPa) | Diameter (μm) |
|---|---|---|---|---|---|
| 0.47~0.7 Mpm | Experimental Example 1 | 1.8 | 220.1 | 3.21 | 6.88 |
| | Experimental Example 2 | 5 | 223.0 | 3.36 | 6.83 |
| | Comparative Example | 1.8~12 | 195.3 | 3.21 | 7.3 |

When comparing mechanical properties according to Experimental Example 1, Experimental Example 2, and Comparative Example with reference to Table 1, in Experimental Example 1, the elasticity of the carbon fiber increased by 12.7%, and the diameter of the carbon fiber decreased by 5.8% due to contraction through carbonization reaction when compared to Comparative Example. Also, in Experimental Example 2, the elasticity of the carbon fiber increased by 14.2%, the tensile strength of the carbon fiber increased by 4.7%, and the diameter of the carbon fiber decreased by 6.2% when compared to Comparative Example. As a result, when judging from the results, it may be seen that the direct heating effect of the microwave increases by changing the structure of the heating element 30 according to the present invention, and thus, the resulting carbon fiber is improved in mechanical property due to the increase of the diameter reduction rate and the increase of the elasticity and tensile strength.

TABLE 2

| | Experimental Example 1 | Experimental Example 2 | Experimental Example 3 | Comparative Example |
|---|---|---|---|---|
| SiC length (cm) | 1.8 | 5 | 6.8 | 1.8~12 |
| Volume ratio (%) | 0.45 | 1.24 | 1.68 | 1.75~5.24 |
| Temperature in quartz (° C.) | 988~1088 | 1120~1232 | 920~1043 | 1070~1198 |
| Power (kW) | 1.2~1.8 | 1.6~2.2 | | |

Referring to Table 2, in Experimental Examples 1 to 3, although the lengths and volume ratios of the SiC heating elements are different, it may be seen that similar power is required so as to maintain the high-temperature carbonization atmosphere when the volume ratio is 1.7% or less. On the other hand, in Comparative Example, it may be seen that more power is required so as to maintain the high-temperature carbonization atmosphere in comparison to Embodiments 1 to 3 because the volume ratio exceeds 1.7%. It may be seen that as the length of the heating element 30 increases and the volume ratio increases, the power to be applied to maintain the quartz internal temperature in the high temperature carbonization atmosphere increases. It may be seen that power required so as to maintain the temperature within the quartz to the high-temperature carbonization atmosphere under a certain length (7 cm) and a volume ratio (1.7%) is similar.

Although the specific embodiments of the present invention have been described, it will be apparent to those skilled in the art that various modifications and variations can be made without departing from the spirit and scope of the invention as defined by the following appended claims.

The invention claimed is:

1. A carbon fiber carbonization apparatus using a microwave, comprising:
   a carbonization furnace in which a carbon fiber is carbonized;
   a moving tube which passes through the carbonization furnace and through which the carbon fiber moves;
   a heating element disposed inside the carbonization furnace, the heating element being disposed outside the moving tube, wherein the heating element is open in a direction in which the microwave is irradiated so that the carbon fiber is directly exposed to and irradiated by the microwave, and wherein the heating element occupies 1.7% or less of an internal volume of the carbonization furnace; and
   an irradiation part configured to irradiate the microwave into the carbonization furnace,
   wherein the heating element has a structure of which one side is opened.

2. The carbon fiber carbonization apparatus of claim 1, wherein the heating element has a hexahedral shape,
   corresponding surfaces of the heating element are penetrated by the moving tube, and
   the moving tube is surrounded by three surfaces of the heating element.

3. The carbon fiber carbonization apparatus of claim 1, wherein the heating element has a length of 1 cm to 7 cm in a direction in which the carbon fiber moves.

4. The carbon fiber carbonization apparatus of claim 1, wherein the inside of the carbonization furnace has an inert gas atmosphere.

5. The carbon fiber carbonization apparatus of claim 1, wherein the irradiation part comprises a waveguide through which the microwave moves, wherein the waveguide is connected to one side of the carbonization furnace.

6. The carbon fiber carbonization apparatus of claim 1, wherein the moving tube is made of quartz.

7. The carbon fiber carbonization apparatus of claim 6, wherein the moving tube made of the quartz has a loss tangent of less than 0.0003.

8. The carbon fiber carbonization apparatus of claim 1, wherein a cross-sectional area of the moving tube is equal to or less than 5.9% of a cross-sectional area of the carbonization furnace.

9. The carbon fiber carbonization apparatus of claim 4, wherein nitrogen is injected into the moving tube to generate the inert gas atmosphere.

10. The carbon fiber carbonization apparatus of claim 1, wherein the heating element has a U-shaped groove defining an interior surface.

* * * * *

UNITED STATES PATENT AND TRADEMARK OFFICE
CERTIFICATE OF CORRECTION

| | |
|---|---|
| PATENT NO. | : 11,459,673 B2 |
| APPLICATION NO. | : 17/047830 |
| DATED | : October 4, 2022 |
| INVENTOR(S) | : Shin et al. |

It is certified that error appears in the above-identified patent and that said Letters Patent is hereby corrected as shown below:

On the Title Page

The inventor data should read as below:
Item (72) Inventors: Ji Hye Shin, Daejeon (KR);
Tae Eon Park, Daejeon (KR);
Su Jin Kim, Daejeon (KR);
Ki Hwan Kim, Daejeon (KR);
Il Ha Lee, Daejeon (KR);
Jun Young Lee, Daejeon (KR)

Signed and Sealed this
Eleventh Day of April, 2023

Katherine Kelly Vidal
*Director of the United States Patent and Trademark Office*